United States Patent
Lin et al.

(10) Patent No.: US 7,541,760 B2
(45) Date of Patent: Jun. 2, 2009

(54) METHOD CAPABLE OF CONTROLLING BRUSHLESS DC MOTOR

(75) Inventors: Jao-Ching Lin, Taipei (TW); Lin-Abel Chu, Taipei (TW); You-Kang Lin, Taipei (TW); Cheng-Chung Tsau, Taipei (TW); Chung-Yi Shen, Taipei (TW)

(73) Assignee: Sentelic Corporation, Hsin Chuang, Taipei Hsien (TW)

( * ) Notice: Subject to any disclaimer, the term of this patent is extended or adjusted under 35 U.S.C. 154(b) by 77 days.

(21) Appl. No.: 11/685,622

(22) Filed: Mar. 13, 2007

(65) Prior Publication Data

US 2008/0252239 A1    Oct. 16, 2008

(51) Int. Cl.
*H02P 6/00*    (2006.01)

(52) U.S. Cl. .............................. 318/400.01; 318/254.1; 318/400.06; 318/400.38; 318/599; 318/811

(58) Field of Classification Search ................. 318/254, 318/138, 254.1, 400.01, 400.06, 400.17, 318/400.38, 432, 599, 721, 811; 363/41
See application file for complete search history.

(56) References Cited

U.S. PATENT DOCUMENTS

| 7,259,531 B1 * | 8/2007 | Liu ........................ 318/400.38 |
| 2006/0119300 A1 * | 6/2006 | Armstrong ................... 318/254 |

* cited by examiner

*Primary Examiner*—Bentsu Ro
*Assistant Examiner*—Antony M Paul (57) ABSTRACT

A method capable of controlling brushless DC motor detects the magnetic pole positions of the rotor with a Hall component to produce a Hall signal correspondingly, generates a PWM signal based on an external control signal with a PWM generator, controls a switch circuit based on the PWM signal and the Hall signal with a driver such that switched output is capable of being sent to the current phase of the stator coils for rotating the rotor. Further, while the Hall signal is detected to be level-switched, the external control signal level increases or decreases corresponding to change of the level of the Hall signal with respect to the duty cycle of the PWM signal being controlled to increase to the preset duty cycle from 0 or to decrease to 0 from the preset duty cycle for eliminating both sharp wave in the current during switching and noise.

13 Claims, 10 Drawing Sheets

METHOD CAPABLE OF CONTROLLING BRUSHLESS DC MOTOR

BACKGROUND OF THE INVENTION

1. Field of the Invention

The present invention is related to a method capable of controlling brushless DC motor and particularly to a method capable of controlling brushless DC motor with pulse width modulation (PWM) and a device thereof.

2. Brief Description of the Related Art

The brushless DC motor with Hall inductor being instead of the changeable electric brush in the traditional DC motor is much suitable for the micro cooling fan system and widely adopted in the low voltage products such as the computer fan, the copy machine and the Laser printer. The single-phase brushless DC motor usually in the computer fan as shown in FIG. 1 includes a stator 11 with wounded coil sets 10 and a 4-pole rotor 12 for rotating fan blades.

Figure 1:
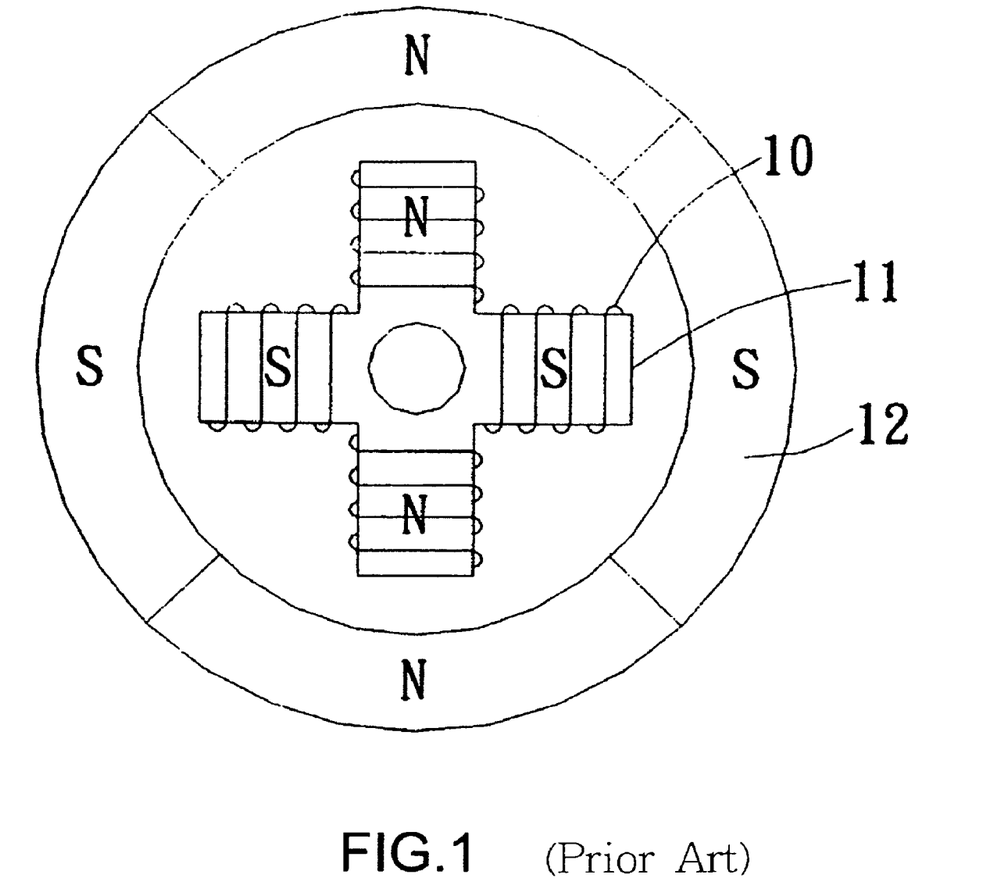
FIG. 1 is a plan view of the conventional brushless DC motor.
Figure 2:
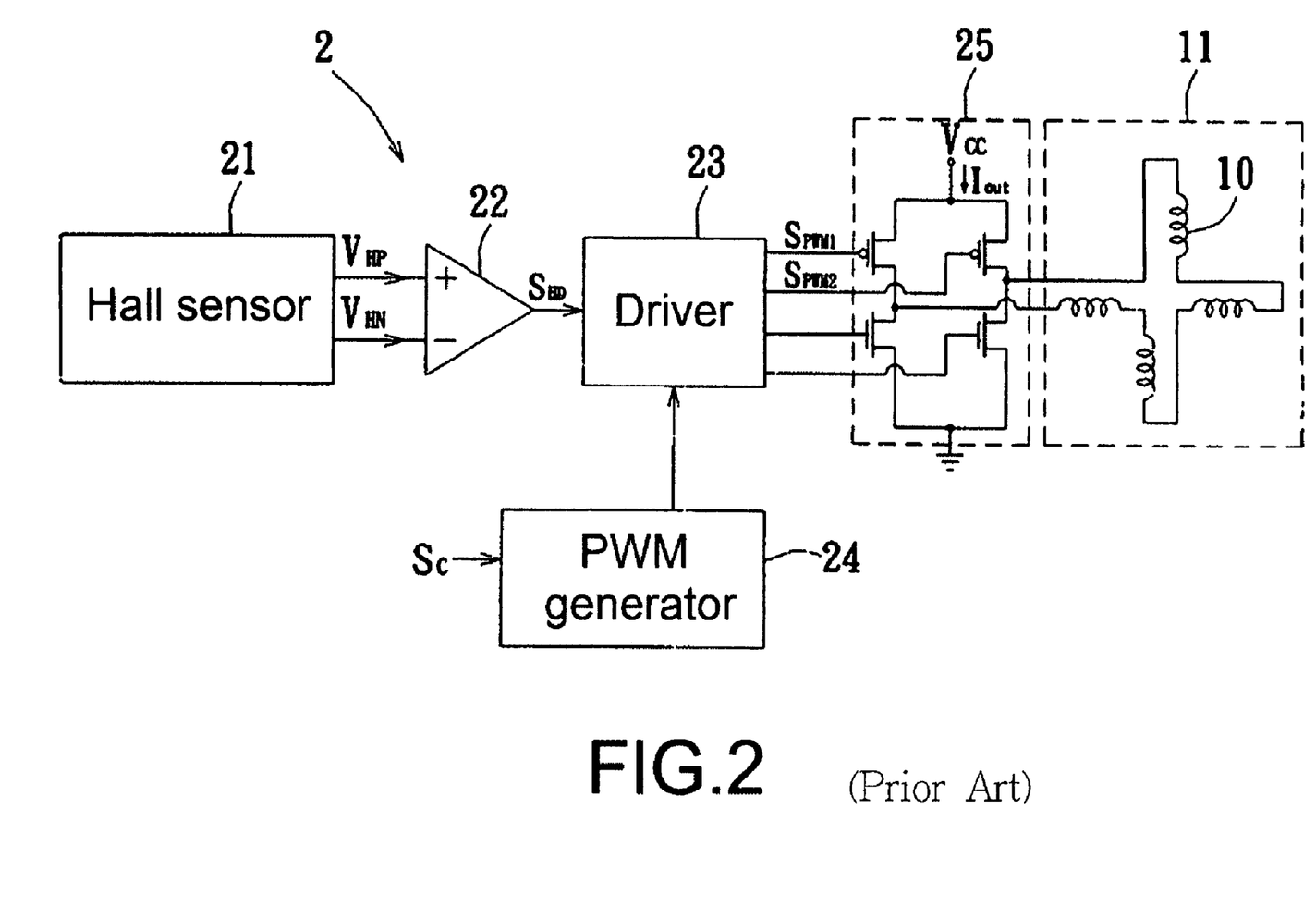
FIG. 2 is a circuit diagram illustrating the conventional method for controlling a brushless DC motor.
Figure 3:
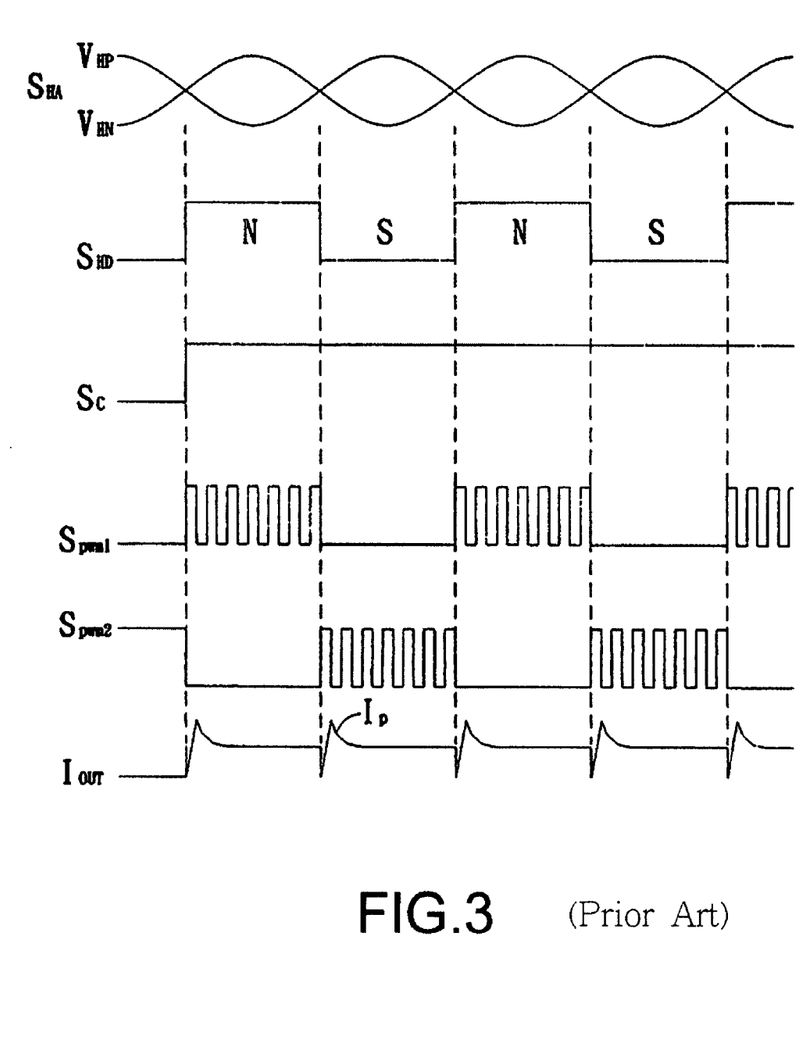
FIG. 3 is a graph illustrating wave curve of output signal of the conventional method for controlling a brushless DC motor shown in FIG. 2.

Referring to FIGS. 2 and 3 in company with FIG. 1, the control device 2 of the conventional single-phase brushless DC motor 1 provides a Hall sensor 21 for sensing the magnetic pole positions of the rotor 12 and producing a Hall signal $S_{HA}$, which is analog signal $V_{HP}$, $V_{HN}$, correspondingly. The Hall signal $S_{HA}$ is input to a comparator 22 and converted as a digitalized Hall signal $S_{HD}$ before being sent to a driver 23. A PWM generator 24 produces a PWM signal being sent to the driver 23 based on an external control signal $S_C$ (voltage signal). The driver 23 outputs the first PWM signal $S_{PWM1}$ and the second PWM signal $S_{PWM2}$ alternately as shown in FIG. 3 corresponding to the magnetic pole positions of the rotor 12 based on the Hall signal $S_{HD}$ and the PWM signal to control the switch circuit 25 switching the phase of the output current $I_{OUT}$, which is sent to coil sets 10, alternately for rotating the rotor 12.

However, instantaneous change during switching between the first PWM signal $S_{PWM1}$ and the second PWM signal $S_{PWM2}$ causes the output current $I_{OUT}$ to produce sharp wave $I_P$ easily and it results in mechanical consonance and noise.

SUMMARY OF THE INVENTION

In order to improve the preceding problems, an object of the present invention is to provide a method capable of controlling a brushless DC motor and a device thereof for eliminating the sharp wave in the output current.

Accordingly, a method capable of controlling a brushless DC motor according to the present invention in which the motor has a stator wounded with coils and a rotor rotating around the stator comprises a Hall component being employed to detect magnetic pole positions and producing a Hall signal correspondingly, a driving unit being employed to produce a PWM signal based on an external control signal and a switch circuit being controlled with the PWM signal and the Hall signal to switch phase of current outputting to the coils for driving the rotor; and it is characterized in that the method further comprises following steps: (A) while level of the Hall signal being detected to switch, level of the external control signal increasing or decreasing according to change of the level of the Hall signal; (B) while the level of the external control signal increasing, duty cycle of PWM signal produced by the driving unit increasing to a preset duty cycle from 0; and (C) while the level of the external control signal decreasing, the duty cycle decreasing to 0 from the preset duty cycle. Thus, the sharp wave in the output current of the switch circuit can be eliminated effectively.

Wherein, the Hall component is a Hall sensor, the Hall signal is a differential analog signal, which is converted to a digital signal with a comparator for inputting to the driving unit, and the external control signal is generated by a PWM duty cycle controller.

In step (A), once differential voltage of the Hall signal reduces to a value less than a reference value, the external control signal decreases to low level from high level at the time of the differential voltage reducing to 0 from the reference value and once the differential voltage of the Hall signal rises to the reference value, the external control signal increases to the high level from the low level.

Wherein, the Hall component is a Hall IC, the Hall signal is a digital signal and the external control signal is generated by a PWM duty cycle controller.

In step (A), the PWM duty cycle controller sets a reference value close to a value counted from a prior wave of the Hall signal and allows the external control signal to decrease to a low level from a high level during current wave of the Hall signal being counted to the reference value and to increase to the high level from the low level after level of the Hall signal being switched.

Further, a control device for implementing the method capable of controlling a brushless DC motor according to the present invention, which has a stator wounded with coils and a rotor rotating around the stator, comprises a Hall component detecting magnetic pole positions and generating a Hall signal correspondingly; a PWM duty cycle controller receiving the Hall signal and an external control signal and allowing level of the external control signal to increase or decrease corresponding to change of the level of the Hall signal at the time of the level of the Hall signal being detected to switchover; a driving unit producing a PWM signal based on the external control signal, increasing duty cycle of the PWM signal to a preset duty cycle during the level of the external control signal increasing, decreasing the duty cycle of the PWM signal to 0 from the preset duty cycle during the level of the external control signal decreasing and producing a driving signal based on the PMW signal and the Hall signal; and a switch circuit being controlled by driving signal, switching and outputting current phase to the coils for rotating the rotor. Thus, the sharp wave in the output current of the switch circuit can be eliminated effectively.

Wherein, the brushless DC motor is single-phase or double-phase brushless DC motor, the driving unit comprises a PWM generator and a driver, wherein the PWM generator produces the PWM signal based on the external control signal, increases the duty cycle to the preset duty cycle during the level of the external control signal increasing, decreases the duty cycle to 0 from the preset duty cycle during the level of the external control signal decreasing and produces a driving signal based on the PMW signal and the Hall signal.

Wherein, the brushless DC motor is a three-phase brushless DC motor and the driving unit is a PWM generator.

The control device further comprises a comparator, the Hall component is a Hall sensor and the Hall signal is a differential analog signal, which is converted to a digital signal and input to the driving unit.

Once differential voltage of the Hall signal being detected by the PWM duty cycle controller reduces to a value less than a reference value, the external control signal decreases to low level from high level at the time of the differential voltage reducing to 0 from the reference value and once the differential voltage rises to the reference value from 0, the external control signal increases to the high level from the low level.

Wherein, the Hall component is a Hall integrated circuit and the Hall signal is a digital signal such that the PWM duty cycle controller capable of setting a reference value close to a value counted from a prior wave of the Hall signal and allowing the external control signal to decrease to a low level from a high level during current wave of the Hall signal being counted to the reference value and to increase to the high level from the low level after level of the Hall signal being switched.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 4:
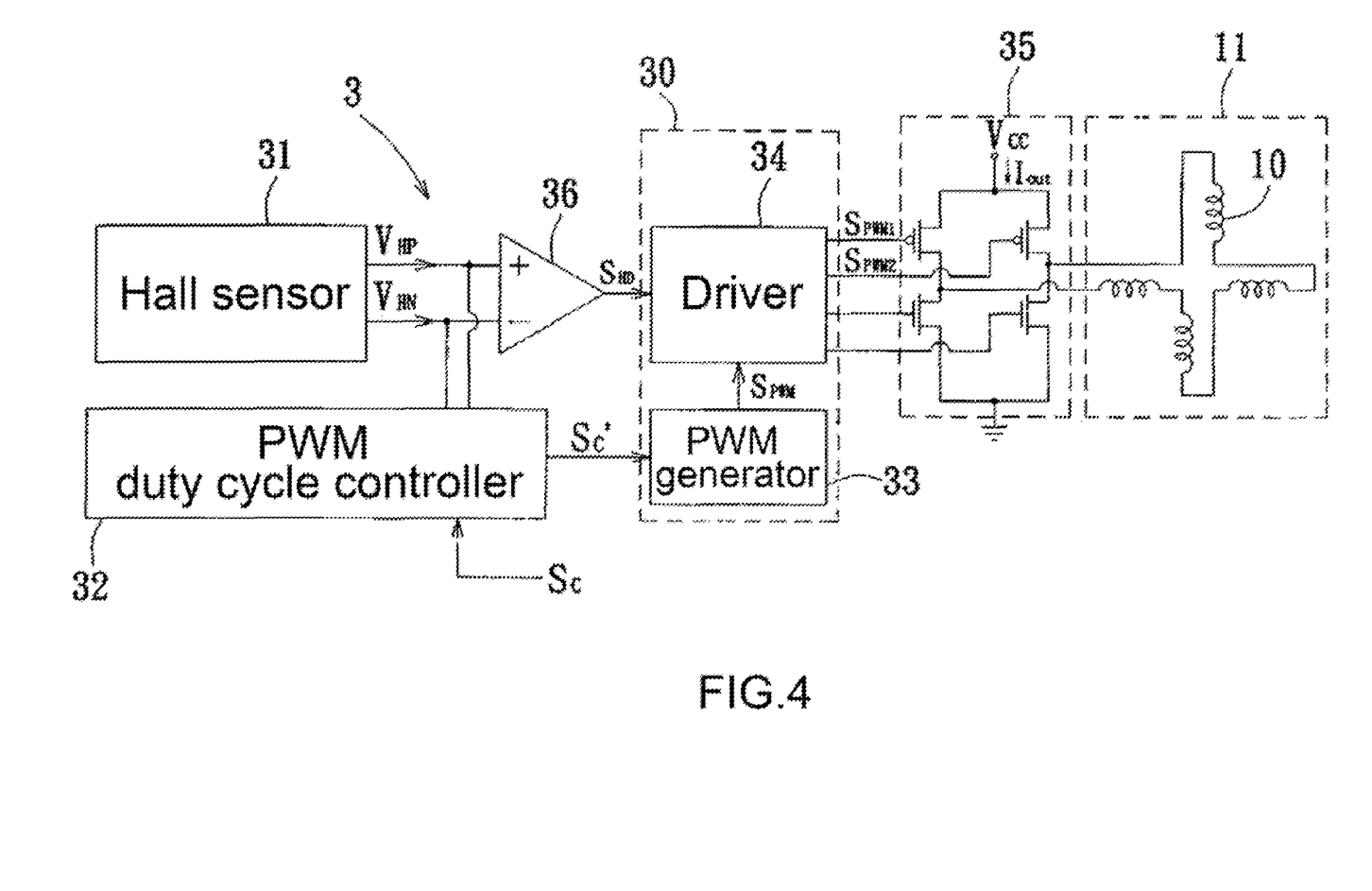
FIG. 4 is a circuit diagram of the first embodiment of the present invention illustrating a method capable of controlling a brushless single phase DC motor according to the present invention.
Figure 5:
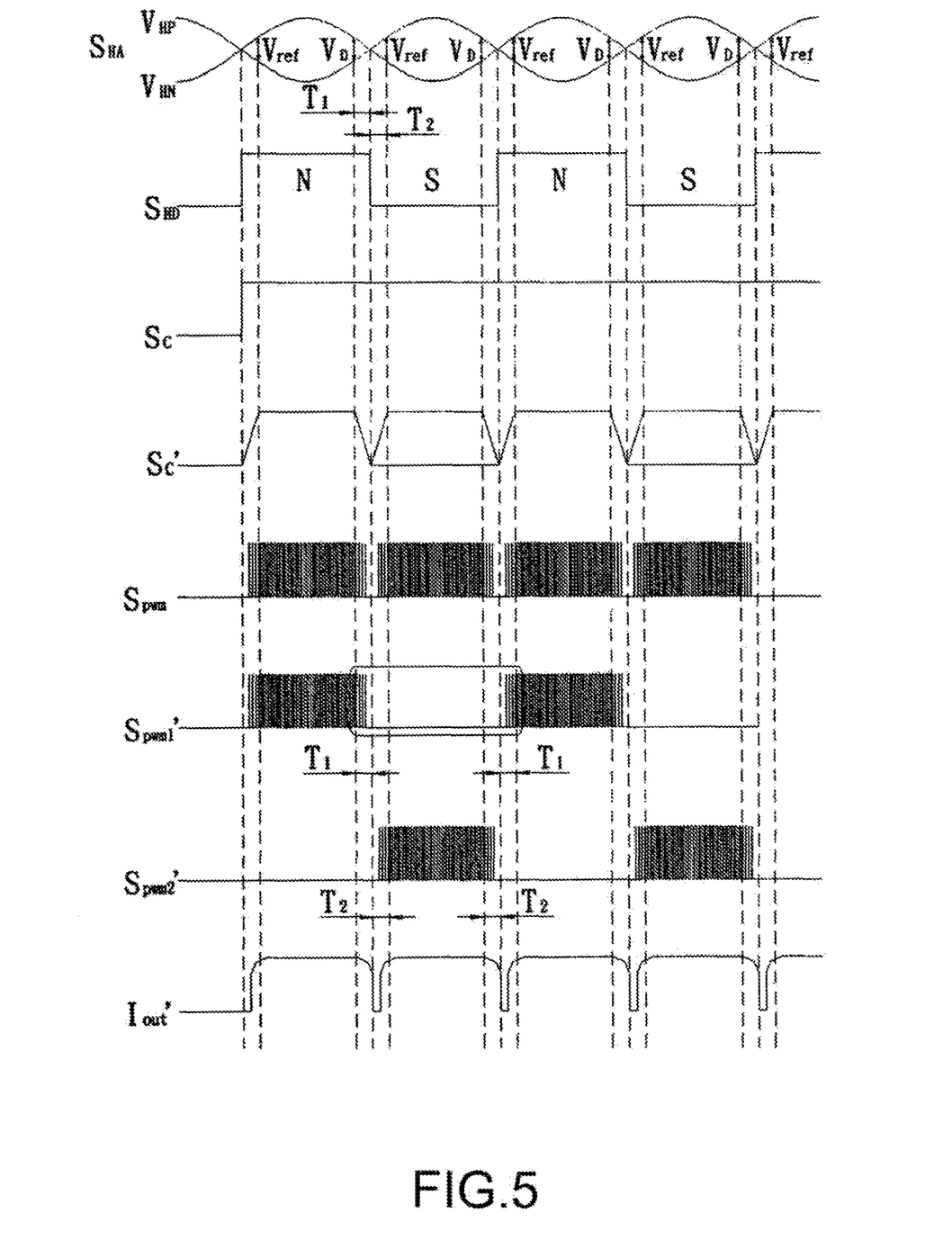
FIG. 5 is a graph illustrating wave curve of output signal of the first embodiment of a method for controlling a brushless DC motor according to the present invention shown in FIG. 4.

Referring to FIGS. 4 and 5, the first preferred embodiment of a method capable of controlling brushless DC motor according to the present invention is illustrated. It is known in FIG. 1 that a brushless single-phase DC motor basically includes a stator 11 tangled with a coil set 10 and a four-pole rotor 12 surrounding the stator 11.

A control device 3 which is shown in FIG. 4, includes a Hall sensor 31, a PWM duty cycle controller 32, a driving unit 30 and a switch circuit 35. The driving unit 30 further includes a PWM generator 33 and a driver 34. The switch circuit 35 is an H-bridge circuit composed of four transistors.

The Hall sensor 31 is disposed near the rotor 12 for sensing positions of magnetic poles of the rotor 12 and creating a Hall signal $S_{HA}$ as shown in FIG. 5. The Hall signal $S_{HA}$ is an analog of differential signals $V_{HP}$ and $V_{HN}$ respectively. The Hall signal $S_{HA}$ is changed to a digital signal $S_{HD}$ via the differential signals $V_{HP}$ and $V_{HN}$ for being input to the driver 34.

The PWM duty cycle controller 32 receives an external control signal $S_C$ and the differential signals $V_{HP}$ and $V_{HN}$. The external control signal $S_C$ is a DC voltage signal for controlling the PWM generator 33 and when the voltage level of the external control signal $S_C$ is changed, the pulse width (duty cycle) of the PWM signal can be modulated. For example, if the voltage level is 5V, the duty cycle of the PWM signal is 50% and if the voltage level is 2.5V, the duty cycle of the PWM signal is 25%.

In order to eliminate the sharp wave in output current $I_{OUT}$ of the switch circuit 35, a reference value, i.e., a reference voltage Vref, is set with the PWM duty cycle controller 32 and the voltage difference $V_D$ (absolute value) between the differential signals $V_{HP}$ and $V_{HN}$ is detected with the controller 32. If the detected voltage difference $V_D$ is less than the reference value Vref, the external control signal $S_C$ is allowed to decrease to a low level such as 0V from a high level such as 5V at the time period $T_1$ in which the voltage difference $V_D$ (absolute value) decreases to 0 (the intersection point of the wave curves of the differential signals $V_{HP}$ and $V_{HN}$) from the reference value Vref and the external control signal $S_C$ is allowed to increase to the high level (5V) from the low level (0V) at the time period T2 in which the voltage difference $V_D$ (absolute value) increases to the reference value Vref from 0 (the intersection point of the wave curves of the differential signals $V_{HP}$ and $V_{HN}$) such that an external control signal $S_C'$, which is adjusted at the time periods $T_1$ and T2 as shown in FIG. 5, is output to the PWM generator 33.

Therefore, when the PWM generator 33 receives the external control signal $S_C'$, PWM signal $S_{PWM}$ as shown in FIG. 5 is generated and input to the driver 34 based on the pulse wave width (duty cycle) of the PWM signal being output by means of voltage level of the external control signal $S_C'$. The PWM signal $S_{PWM}$ produces a uniform pulse wave width such as 50% corresponding to the high level wave shape of the external control signal $S_C'$. Nevertheless, the pulse wave width of the PWM signal $S_{PWM}$ is adjusted to decrease or increase gradually corresponding to increasing margin and decreasing margin of the external control signal $S_C'$ at the time periods $T_1$ and T2 based on the voltage increasing or decreasing.

The driver 34 outputs the first PWM signal $S_{PWM1}'$ and the second PWM signal $S_{PWM2}'$ alternately to control the switch circuit 35 based on magnetic positions of the rotor 12 corresponding to the PWM signal $S_{PWM}$ and the Hall signal $S_{HD}$ respectively.

Figure 6:
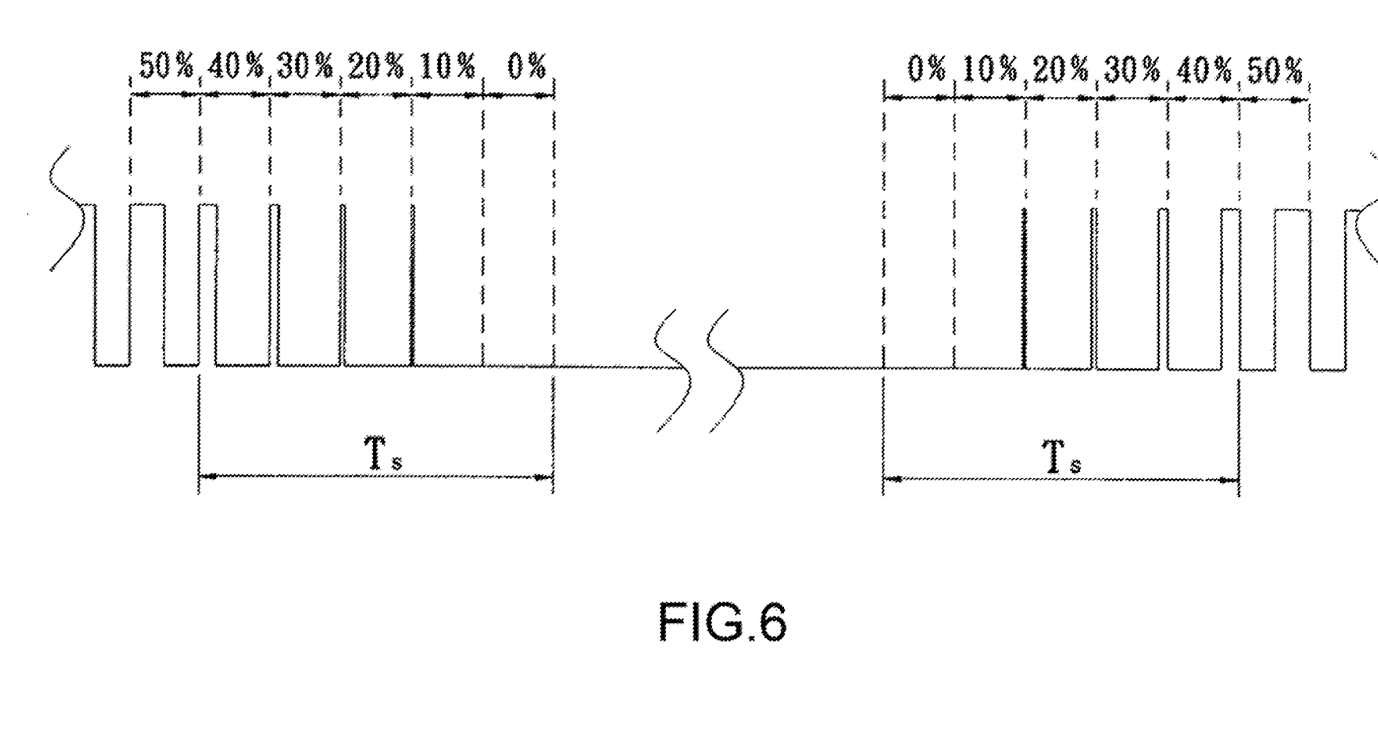
FIGS. 6 is an enlarged diagram of the first PWM signal.

Thus, the switch circuit 35 is controlled with the first PWM signal $S_{PWM1}'$ and the second PWM signal $S_{PWN2}'$ alternately for sending output current Iout and the switch between the first PWM signal $S_{PWM1}'$ and the second PWM signal $S_{PWM2}'$ is performed in a way of the pulse wave width of the first PWM signal $S_{PWM1}'$ gradually decreasing to 0 from the preset duty cycle (50%) then the pulse width of the second PWM signal $S_{PWM2}'$ gradually increasing to the preset duty cycle (50%) instead of instantaneous shift as shown in FIG. 6. As a result, the output current Iout of the switch circuit 35 is incapable of producing instantaneous sharp wave during switch between the first PWM signal $S_{PWM1}'$ and the second PWM signal $S_{PWM2}'$.

Figure 7:
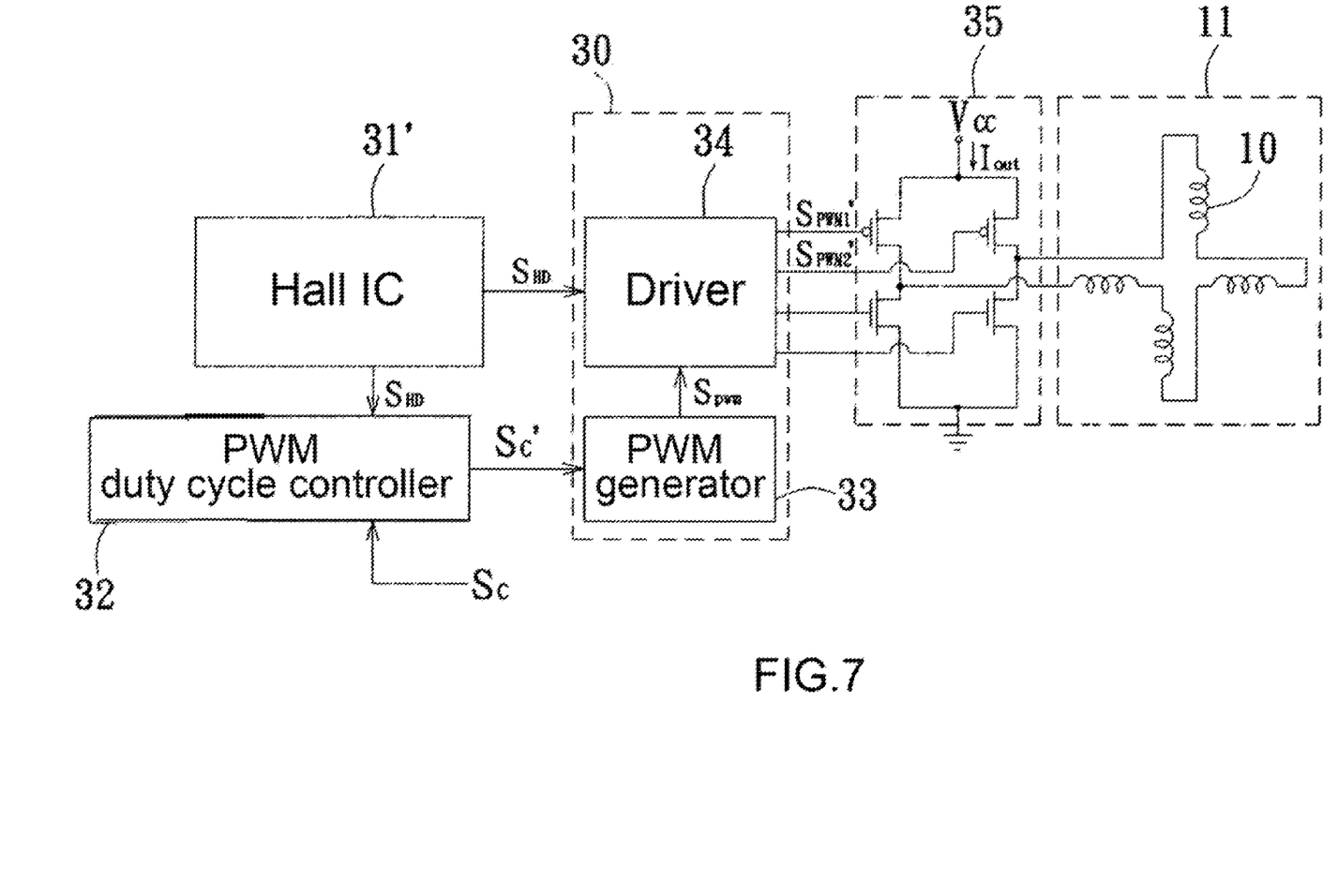
FIG. 7 is a circuit diagram of the second embodiment of the present invention illustrating another method capable of controlling a brushless single phase DC motor according to the present invention.

Referring FIG. 7, the second preferred embodiment of a method capable of controlling brushless DC motor according to the present invention is illustrated. The difference of the second embodiment from the preceding first embodiment is in that a Hall IC 31' is employed instead of the Hall sensor 31 of the first embodiment. Further, the Hall IC 31' is capable of sensing magnetic pole positions and outputting the digital signal $S_{HD}$ shown in FIG. 5 so that the comparator 36 of the first embodiment is not necessary in the present embodiment.

Because the Hall signal $S_{HD}$ output from the Hall IC 31' is a digital signal instead of analog signal, the PWM duty cycle controller 32 in the second embodiment provides a counter to calculate the cycle of the Hall signal $S_{HD}$ such that switch point of the Hall signal $S_{HD}$'s level with respect to adjustment of the external control signal level is capable of being obtained for eliminating the sharp wave of the output circuit Iout. Accordingly, counted values of the high level wave shape (N) and low level wave shape (S) can be figured out and the current wave shape can be estimated with the preceding counted value. Further, a reference value is set to be close to and less than the preceding counted value.

When the counted value of the current wave shape is counted with the PWM duty cycle controller 32 and reached the reference value, the reference value is employed to count period $T_1$ right before the current wave shape being switched so as to allow the external control signal $S_C$ decreasing to the low level from the high level. Further, the external control signal $S_C$ increases to the high level from the low level after the Hall signal $S_{HD}$'s level being switched and outputting margin adjusted external control signal $S_C'$ to the PWM generator 33 as shown in FIG. 5.

Therefore, similar to the first embodiment, the PWM generator 33 shown in FIG. 7 is capable of modulating the pulse width based on voltage level of the external control signal $S_C'$ and producing PWM signal $S_{PWM}$ shown in FIG. 5.

Figure 8:
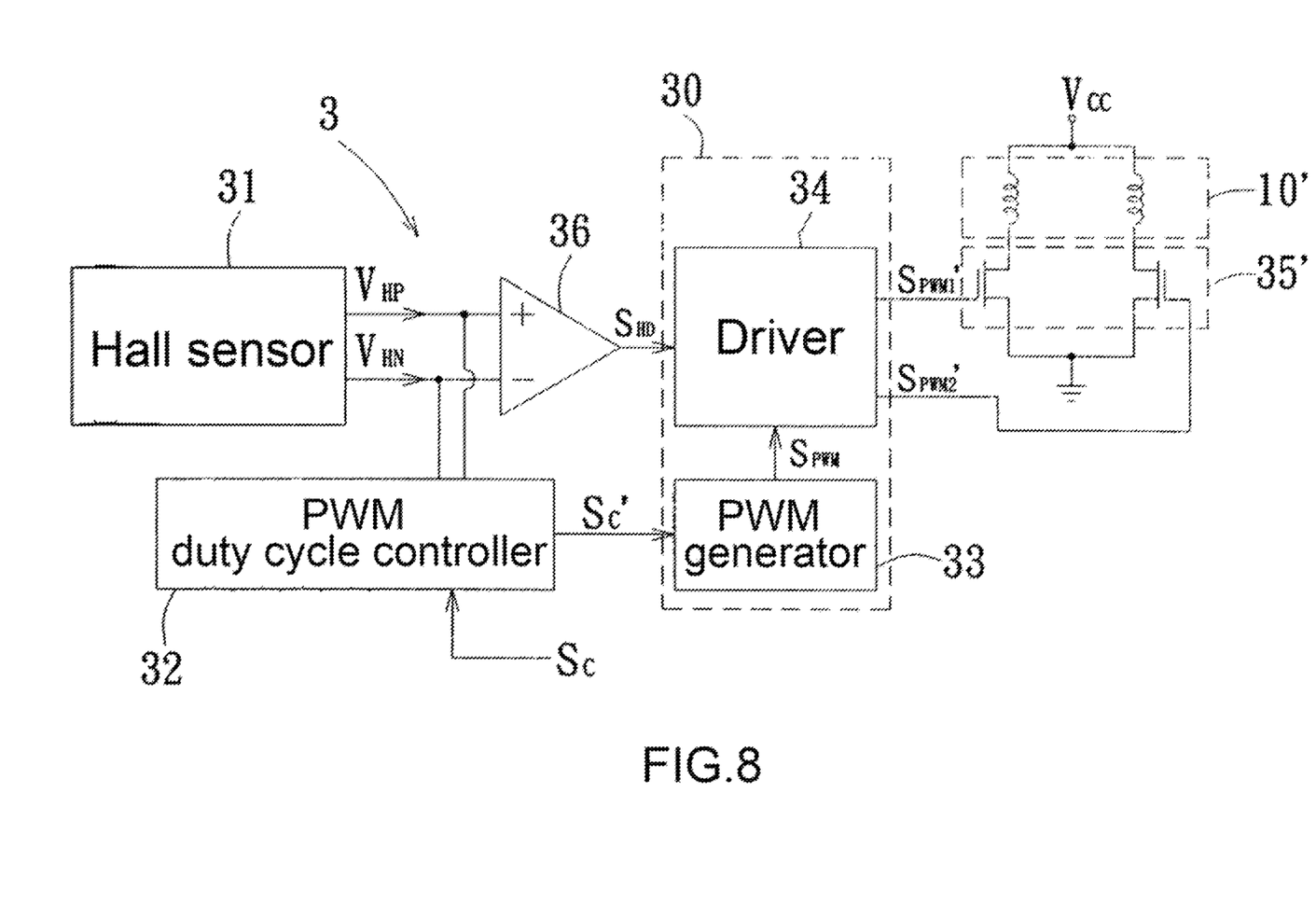
FIG. 8 is a circuit diagram of the third embodiment of the present invention illustrating a method capable of controlling a brushless double-phase DC motor according to the present invention.

Referring to FIG. 8, the third preferred embodiment of a method capable of controlling brushless DC motor according to the present invention is illustrated. The present embodiment is employed to control double-phase DC brushless motor and the difference of the present embodiment from the preceding embodiments is in that switch circuit 35' of stator coil sets 10' is controlled due to the stator of the double-phase brushless DC motor having two coil sets being controlled separately.

Figure 9:
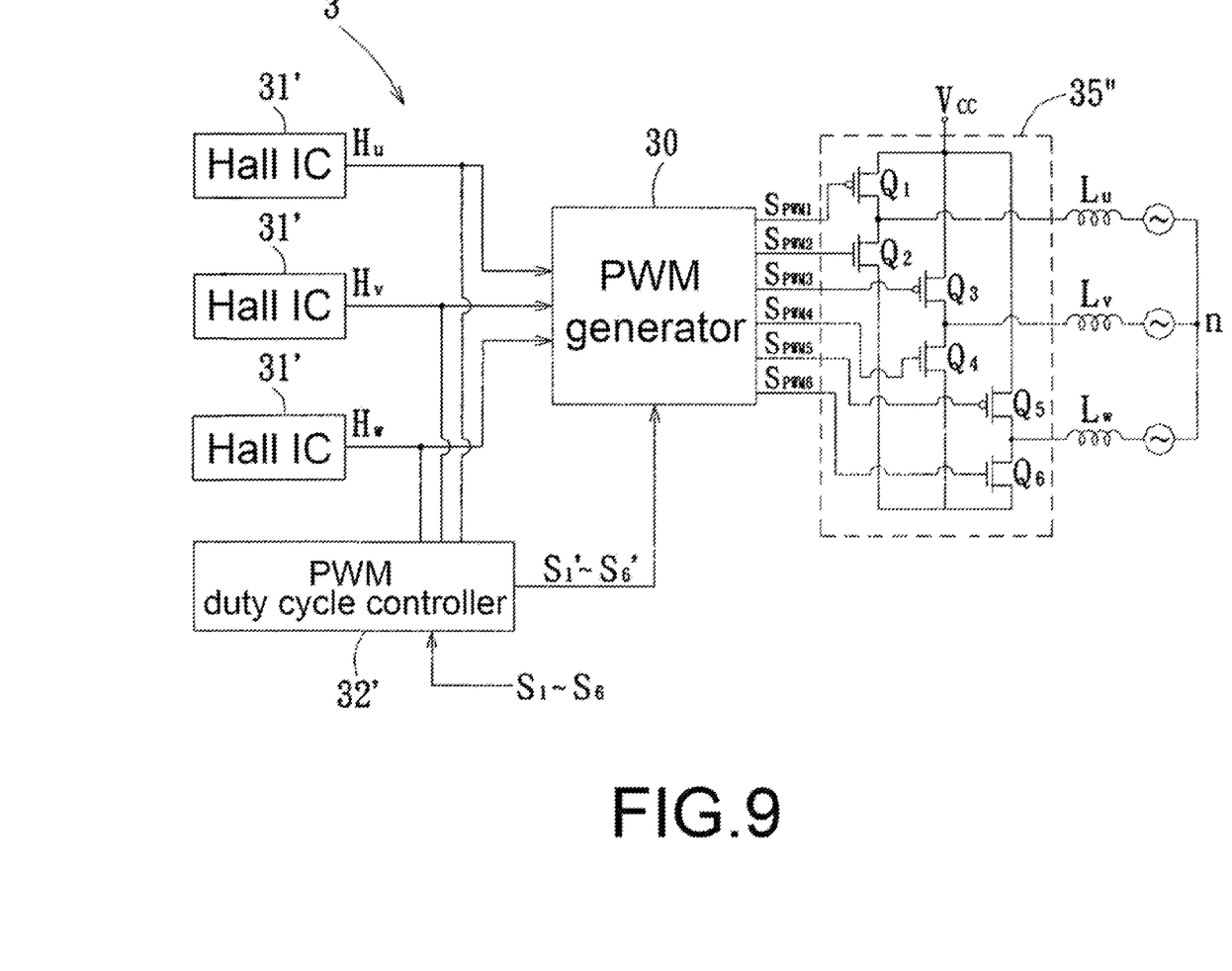
FIG. 9 is a circuit diagram of the fourth embodiment of the present invention illustrating a method capable of controlling a brushless three-phase DC motor according to the present invention.
Figure 10:
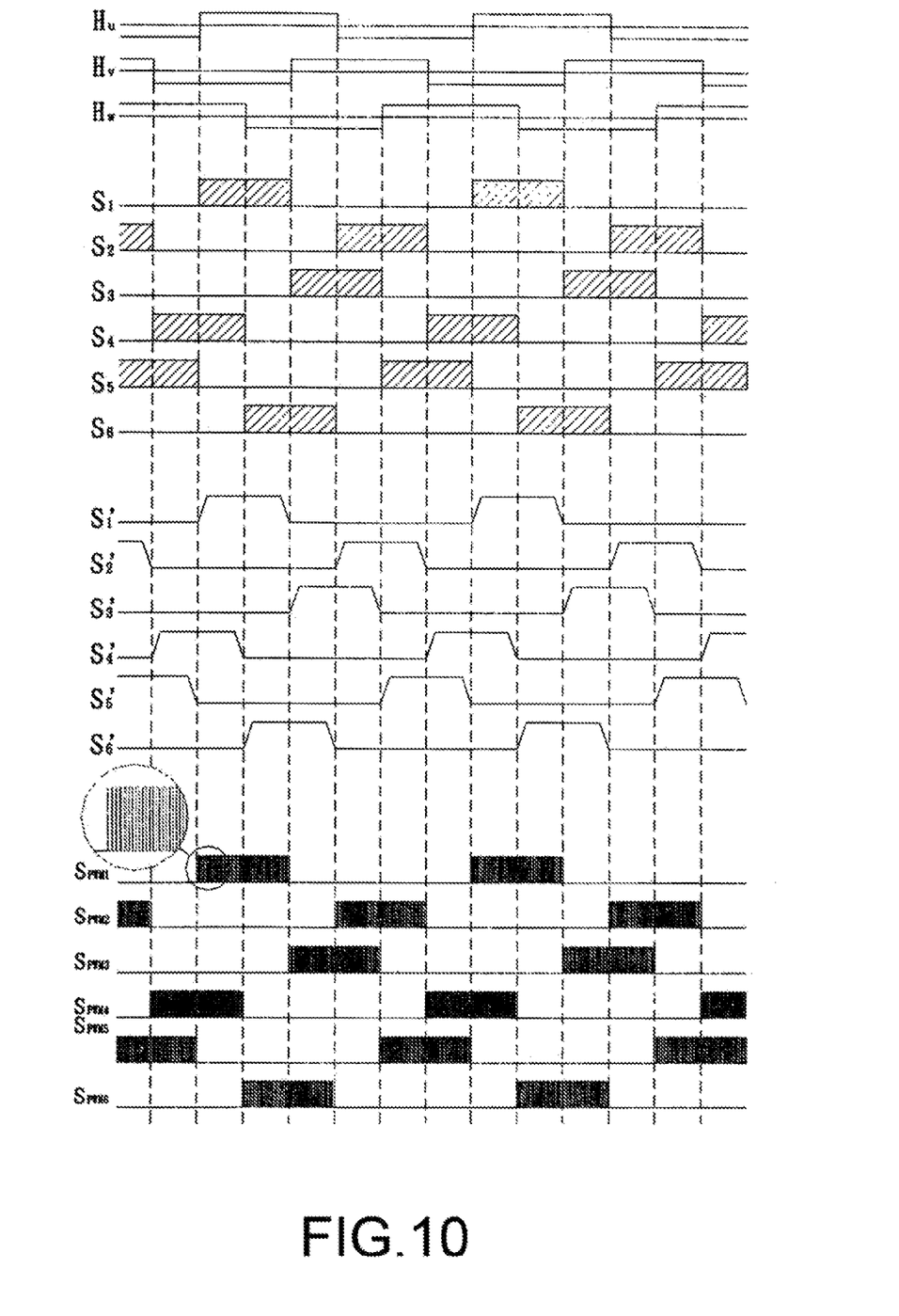
FIG. 10 is a graph illustrating wave curve of output signal of the forth embodiment according to the present invention.

Referring to FIG. 9, the fourth preferred embodiment of a method capable of controlling brushless DC motor according to the present invention is illustrated. The present embodiment is employed to control three-phase DC brushless motor and the difference of the embodiment from the preceding embodiments is in that three Hall sensing ICs 31 are required for detecting magnetic poles of the rotor due to the stator of the three-phase brushless DC motor having three coil sets Lu, Lv and Lw being controlled separately. Further, the three-phase brushless DC motor is controlled by means of two-phase modulation, that is, two of the three phase coils are conducted at a certain instantaneous time and the another one of the three phase coils keeps without being conducted. Thus, the switch circuit 35" provides three parallel bridge arms with each of the bridge arms having two switch components, an upper arm component Q1, Q3, Q5 and a lower arm component Q2, Q4, Q6, respectively. It can be seen in FIG. 10 that the three Hall sensing ICs 31 produce sensing signals Hu, Hv, Hw respectively outputting to the PWM duty cycle controller 32' and the driving unit 30'. The driving unit 30' in the present embodiment is a PWM generator. Similar to operational principle of the first embodiment, the PWM duty cycle controller 32' produces margin adjusted external control signals $S_1'\sim S_6'$ based on the sensing signals Hu, Hv, Hw and the external control signals $S_1'\sim S_6'$ and the external control signals $S_1'\sim S_6'$ are sent to the driving unit (PWM generator) 30. Then, the driving unit 30 produces the PWM signal $S_{PWN1}$, $S_{PWM2}$ outputting to all the switch components Q1~O6 of the control switch circuit 35" based on the sensing signals Hu, Hv, Hw and the external control signals $S_1'\sim S_6'$ such that the switch circuit 35" is incapable of outputting current with instantaneous sharp wave at the time of instantaneous switch of the PWM signal. In this way, the sharp wave of the output current is eliminated effectively It is appreciated that a method capable of controlling brushless DC motor according to the present invention allows voltage level of the external control signal $S_C$ being adjusted at the time of the Hall signal level being switched to modulate pulse width of the PWM signal increasingly or decreasingly and the output current $I_{out}$ produced by the driver 34 being incapable of producing sharp wave at the time of the driver 34 switching the PWM signal instantaneously for reducing mechanical consonance and noise created by the motor.

While the invention has been described with referencing to preferred embodiments thereof, it is to be understood that modifications or variations may be easily made without departing from the spirit of this invention, which is defined by the appended claims.

What is claimed is:

1. A method capable of controlling a brushless DC motor, which has a stator wound with a plurality of coils and a rotor rotating around the stator, comprising the following steps:
   a Hall component detecting a magnetic pole position and producing a Hall signal corresponding to said magnetic pole position;
   a driving unit producing a PWM signal based on an external control signal; and
   a switch circuit being controlled with the PWM signal and the Hall signal to switch the phase of a current outputting to the coils for driving the rotor;
   characterized in that the method further comprises following steps:
   (A) the level of the external control signal increasing or decreasing corresponding to a change of the level of the Hall signal at the time of the level of the Hall signal being detected to be switched;
   (B) the duty cycle of the PWM signal gradually increasing to a preset duty cycle from 0 while the level of the external control signal increasing; and
   (C) said duty cycle gradually decreasing to 0 from the preset duty cycle while the level of the external control signal decreasing.

2. The method capable of controlling brushless DC motor as defined in claim 1, wherein the Hall component is a Hall sensor, the Hall signal is a differential analog signal, which is converted to a digital signal with a comparator for inputting to the driving unit, and the external control signal is generated by a PWM duty cycle controller.

3. The method capable of controlling brushless DC motor as defined in claim 2, wherein when an differential voltage of the Hall signal reduces to a value less than a reference value, the external control signal decreases to a low level from a high level at the time of the differential voltage reducing to 0 from the reference value and when the differential voltage of the Hall signal rises to said reference value, the external control signal increases to the high level from the low level.

4. The method capable of controlling brushless DC motor as defined in claim 1, wherein the Hall component is a Hall IC, the Hall signal is a digital signal and the external control signal is generated by a PWM duty cycle controller.

5. The method capable of controlling brushless DC motor as defined in claim 4, wherein the PWM duty cycle controller sets a reference value close to a value counted from a prior wave of the Hall signal and allows the external control signal to decrease to a low level from a high level during current wave of the Hall signal being counted to the reference value and to increase to the high level from the low level after level of the Hall signal being switched.

6. A control device for a brushless DC motor, which has a stator wound with a plurality of coils and a rotor rotating around the stator, comprising:

a Hall component detecting a magnetic pole position and generating a Hall signal correspondingly;

a PWM duty cycle controller receiving the Hall signal and an external control signal and allowing a level of the external control signal to increase or decrease corresponding to change of a level of the Hall signal at the time of the level of the Hall signal being detected to switchover;

a driving unit producing a PWM signal based on the external control signal; and a switch circuit being controlled with the PWM signal, switching the phase of an output current and outputting said current to the coils for rotating the rotor;

characterized in that the driving unit increases the duty cycle of the PWM signal to a preset duty cycle gradually during the level of the external control signal increasing, decreases the duty cycle of the PWM signal to 0 from the preset duty cycle gradually during the level of the external control signal decreasing and produces a driving signal based on the PMW signal and the Hall signal.

7. The control device for a brushless DC motor as defined in claim 6, wherein the brushless DC motor is a single-phase or double-phase brushless DC motor, the driving unit comprises a PWM generator and a driver, wherein the PWM generator produces the PWM signal based on the external control signal, increases the duty cycle to the preset duty cycle during the level of the external control signal increasing, decreases the duty cycle to 0 from the preset duty cycle during the level of the external control signal decreasing and produces a driving signal based on the PMW signal and the Hall signal.

8. The control device for a brushless DC motor as defined in claim 7 further comprises a comparator, the Hall component is a Hall sensor and the Hall signal is a differential analog signal, which is converted to a digital signal and input to the driving unit.

9. The control device for a brushless DC motor as defined in claim 8, wherein when a differential voltage of the Hall signal being detected by the PWM duty cycle controller reduces to a value less than a reference value, the external control signal decreases to low level from high level at the time of the differential voltage reducing to 0 from the reference value and once the differential voltage rises to the reference value from 0, the external control signal increases to the high level from the low level.

10. The control device for a brushless DC motor as defined in claim 7, wherein the Hall component is a Hall integrated circuit and the Hall signal is a digital signal such that the PWM duty cycle controller capable of setting a reference value close to a value counted from a prior wave of the Hall signal and allowing the external control signal to decrease to a low level from a high level during current wave of the Hall signal being counted to the reference value and to increase to the high level from the low level after level of the Hall signal being switched.

11. The control device for a brushless DC motor as defined in claim 6, wherein the brushless DC motor is a three-phase brushless DC motor and the driving unit is a PWM generator.

12. The control device for a brushless DC motor as defined in claim 11 further comprises a comparator, the Hall component is a Hall sensor and the Hall signal is a differential analog signal, which is converted to a digital signal and input to the driving unit.

13. The control device for a brushless DC motor as defined in claim 11, wherein the Hall component is a Hall integrated circuit and the Hall signal is a digital signal such that the PWM duty cycle controller capable of setting a reference value close to a value counted from a prior wave of the Hall signal and allowing the external control signal to decrease to a low level from a high level during current wave of the Hall signal being counted to the reference value and to increase to the high level from the low level after level of the Hall signal being switched.

\* \* \* \* \*